US005668940A

United States Patent [19]

Steiner et al.

[11] Patent Number: 5,668,940
[45] Date of Patent: Sep. 16, 1997

[54] METHOD AND APPARATUS FOR ANTI-ALIASING POLYGON EDGES IN A COMPUTER IMAGING SYSTEM

[75] Inventors: Walter Robert Steiner; Michael Leroy Morgan, both of Ormond Beach, Fla.

[73] Assignee: Martin Marietta Corporation, King of Prussia, Pa.

[21] Appl. No.: 292,209

[22] Filed: Aug. 19, 1994

[51] Int. Cl.[6] ................................ G06T 11/40
[52] U.S. Cl. .................. 345/429; 345/431; 345/432
[58] Field of Search ......................... 395/141, 118, 395/100, 129, 131, 132

[56] References Cited

U.S. PATENT DOCUMENTS

| | | | |
|---|---|---|---|
| 4,677,576 | 6/1987 | Berlin, Jr. et al. | 364/522 |
| 4,727,365 | 2/1988 | Bunker et al. | 340/728 |
| 4,825,391 | 4/1989 | Merz | 364/526 |
| 5,339,092 | 8/1994 | Johnson et al. | 345/136 |
| 5,363,475 | 11/1994 | Baker et al. | 395/122 |
| 5,392,385 | 2/1995 | Evangelisti et al. | 395/131 |

*Primary Examiner*—Mark K. Zimmerman
*Assistant Examiner*—Tobi C. Clinton
*Attorney, Agent, or Firm*—Geoffrey H. Krauss

[57] ABSTRACT

The final viewable color of each pixel to be displayed from video data signal output of a computer image generator, is found by: using input data signals setting display space coordinates of each vertex of each face polygon to be displayed, to generate a crossing location of each polygon edge along an edge segment of any of the array of display pixels; storing, and then processing, the edge segment crossing data signals for all polygons affecting that pixel, along with color data for each of the faces occupying any portion of that pixel, and for a plurality of different edge segments of a constellation of four adjacent pixels, to obtain pixel color intensity data for each corner of each displayable pixel; and mixing polygon color intensity data signals for all corners of a presently-processed pixel, to determine the final, observable color of that display pixel.

20 Claims, 12 Drawing Sheets

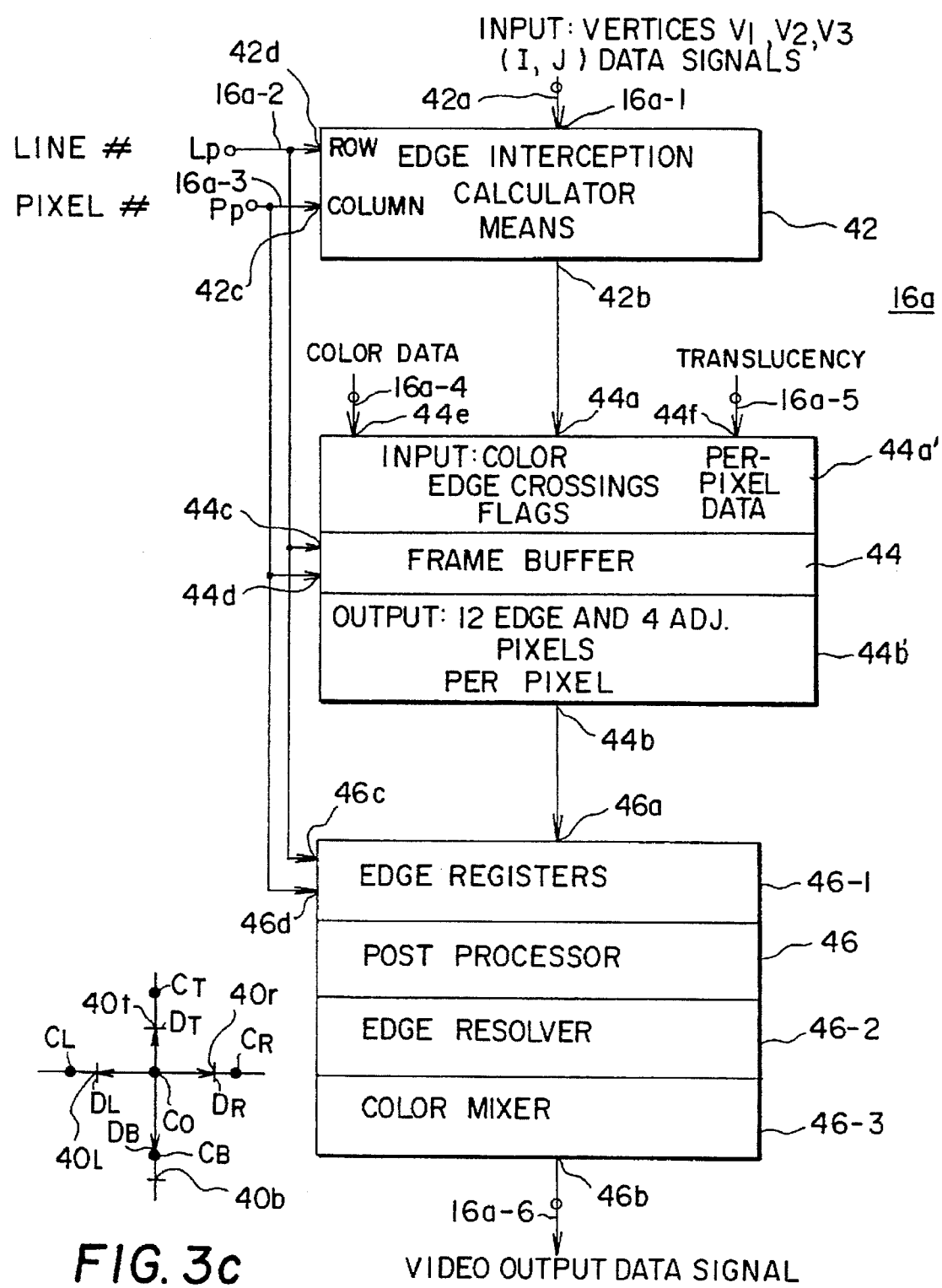

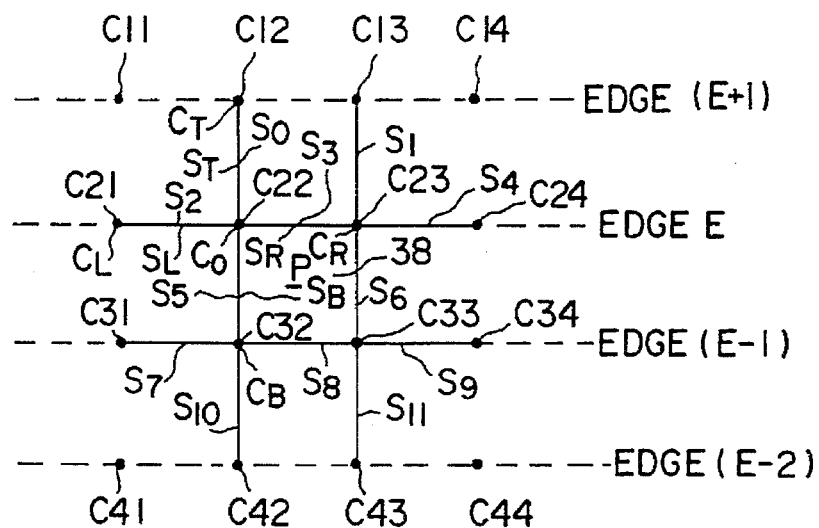
FIG. 5b'
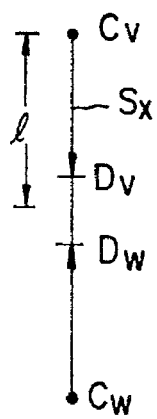
FIG. 5b"
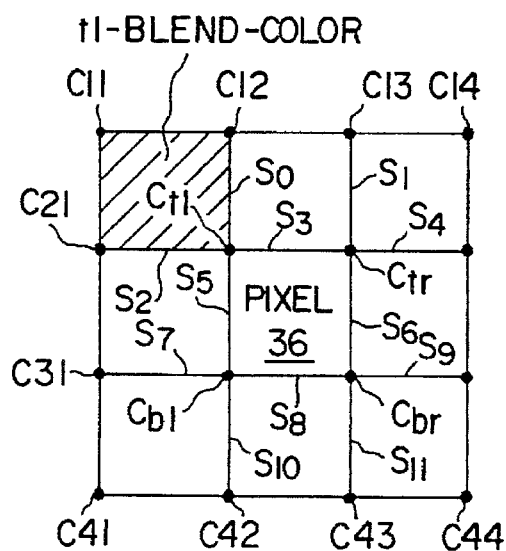
FIG. 5c

METHOD AND APPARATUS FOR ANTI-ALIASING POLYGON EDGES IN A COMPUTER IMAGING SYSTEM

FIELD OF THE INVENTION

This invention relates to computer image generation (CIG) systems and, more particularly, to a novel color determination means for use in a display processor and to novel methods for processing of image data describing object faces, for display of two-dimensional representations of those objects in a real-time imaging system.

BACKGROUND OF THE INVENTION

Real-time computer image systems are being designed to provide realistic image reproduction for a variety of simulator systems, such as tank simulators and flight simulators. Such simulators are used as training devices which permit a combatant to obtain practice without the necessity of going out into the field and using the actual combat systems. The simulators enable a user, such as a pilot or tank gunner, to maintain and improve his skills without the cost associated with live training. It is thus very advantageous to provide the user with video display realism which is beneficial for training and practice purposes.

In a typical real-time computer image generation system, such as a flight simulator system, image generation can be broken into three separate processing stages: Controller, Geometry Processor, and Display Processor. These three processing stages or sections each work independently on data representative of or corresponding to one of three consecutive scenes to be displayed. The Controller processes data on a scene or image for a fixed time, which may be either a field time of 16.67 milliseconds or a frame time of 33.3 milliseconds, usually the former, and then passes its processed data to the Geometry Processor. This particular field and frame time corresponds to that time for a typical television format display, i.e., two interlaced fields per frame with thirty frames per second. The Geometry Processor has an equal time to do its calculations and at the end of that time its results are sent to the Display Processor. The Display Processor always processes one interlace field for a video display in one field time. For each time interval, all three processors are kept busy, so that, at any given time, the processors are working on three separate scenes. Each section processes inputs and generates outputs during the interval, so data flows through the three stages in a sequential manner. The computational load is spread out among the specialized processor sections, so this allows new scenes to be displayed each field or frame time, even though the results are delayed three fields or frames.

For example, in a flight simulator system, pilot inputs are received by the Controller and after being processed sequentially by the Controller, the Geometry Processor and Display Processor, the output is sent as a color scene to video displays observed by the pilot in the simulator. The data seen by the pilot starts out as simple control inputs applied to an environment definition and is converted to pixel video display information. In the controller, the pilot inputs are used to calculate the new position and orientation of the aircraft, and from this, a mathematical rotation matrix is calculated that is used to rotate objects from the reference coordinate system to a display coordinate system. Any other information dealing with the aircraft, with the position of targets and with other aircraft is also calculated in the Controller. In some applications, the Controller is a general-purpose computer.

The Geometry Processor reads, from a database, descriptions of objects that are potentially visible in the stored three-dimensional digital representation of the scene. The objects that are read are rotated into display coordinates using the rotation matrices calculated in the Controller. Edges of these three-dimensional objects are clipped by the Geometry Processor if they extend beyond the view window boundaries. The Geometry Processor mathematically projects the three-dimensional data onto the two-dimensional display window. Object faces which extend beyond display window boundaries are clipped in two-dimensional image space. In addition, the Geometry Processor calculates (as by use of a depth-buffer or the like) which objects are in front or behind other objects and stores this information in a priority list. Each object processed is made up of individual faces, where each face is in the form of a polygon bounded by straight edges. The priority list contains the order of all faces in the scene, with the first face in the list as the highest priority face, and the last face in the list as the lowest priority face. Whenever two faces overlap on the display, the higher priority face will be visible, and the lower priority face will be obscured. Lastly, the Geometry Processor calculates the display end points for the edges that bound the two-dimensional faces, and also calculates the coefficients of the line equations that describe these bounding edges.

The Display Processor receives the two-dimensional face descriptions, along with face color, face fading information, a face priority list, cell texturing level-of-detail blending, translucency, curvature shading etc., and uses this information to output data describing to a color display each pixel in the scene. Each color display in the system is typically made up of 1024 lines of video information, with each line having 1024 individual color dots or pixels. However, other combinations of lines and pixels per line are certainly possible. The Display Processor has to resolve, for each pixel, what the color of the pixel should be, given that many faces can be present in a pixel, and that certain portions of faces may be covered by other faces. Since there can be 1024 by 1024 pixels in the display, and all these need to be calculated in 1/60th of a second, the processing load in the Display Processor is very high. To calculate video for a multi-display system (a single system has contained as many as 14 displays), the Display Processor must perform in excess of 10 billion computations per second. Due to the tremendous processing load, a Display Processor can drive only a few displays. In some systems, a single Controller and Geometry Processor can be used to drive several Display Processors with several displays connected to each Display Processor. The Display Processor therefore represents the majority of processing in a real-time computer image generation system, and for this reason most of the effort to improve the capabilities and realism of a CIG system is concentrated in the Display Processor area.

One persistent problem has been to process pixel color intensity information in an anti-aliasing manner, which allows for suitable high-definition edge effects to be visible while preventing undesirable video data components ("distortion") from taking on the identity of a desired component, so as to appear as the wrong color, or degree of translucency, in that pixel.

BRIEF SUMMARY OF THE INVENTION

In accordance with the invention, a display processor in a real-time computer image generator includes: edge interception calculator means, receiving input data signals characterizing the display space (I,J) coordinates of each of at least three vertices of each polygon to be displayed, for determining which edges, if any, of each sequential pixel of the display raster, are cut by a polygon edge, and the location of the cut along the determined edge; the edge crossing data signals for all polygons affecting each pixel are stored on a per-pixel basis in a frame buffer, along with color data for each of the faces occupying any portion of that pixel; and a post processor means, receiving data signals characterizing, for each pixel to be displayed, 12 edges of a constellation of four adjacent pixels, for resolving edge relationships and mixing polygon color intensity data to determine the final, observable color of each pixel to be displayed by a display means receiving the video data output of the CIG.

A method for determining the final viewable color of each pixel to be displayed by a display means receiving the video data output of a real-time computer image generator, comprises the steps of: first receiving input data signals characterizing the display space (I,J) coordinates of each of at least three vertices of each face polygon to be displayed; and then utilizing the vertex data to determine which polygon edges, if any, cut one of the sequence of pixels forming the display raster; and then determining the location of the cut along the associated pixel edge. The edge crossing data signals for all polygons affecting each pixel are stored on a per-pixel basis in a frame buffer, along with color data for each of the polygons occupying any portion of that pixel; and, for each pixel to be displayed, a constellation of several (e.g. 12) edges of selected adjacent pixels, are processed for resolving edge relationships and mixing polygon color intensity data to determine the final, observable color of each display pixel.

Accordingly, it is an object of the present invention to provide novel apparatus and methods for determining the color intensity of each pixel in a computer image system display.

This and other objects of the invention will become apparent upon reading of the following detailed description of presently preferred embodiments, when considered in conjunction with the associated drawings.

BRIEF DESCRIPTION OF THE DRAWINGS

FIG. 3c is a representation of a pixel corner Co in constellation with its adjacent corners, edge crossings and distances, and useful in appreciating several aspects of the present invention;

FIG. 4 is a block diagram of a color intensity subassembly, in accordance with the principles of the present invention, for use in a CIG display processor;

FIG. 5b' illustrates an 8-pixel, 12-segment constellation about each pixel-being-operated-upon and is useful in understanding method operation;

FIG. 5b" illustrates one aspect of line length determination in the present method;

FIG. 5c illustrates blend color implementation in a 3×3 pixel constellation;

FIG. 6a illustrates the complementary sets of corners sampled for different translucency levels and different binary values of a Pattern Select bit, while

DESCRIPTION OF AN ILLUSTRATIVE EMBODIMENT

Figure 1:
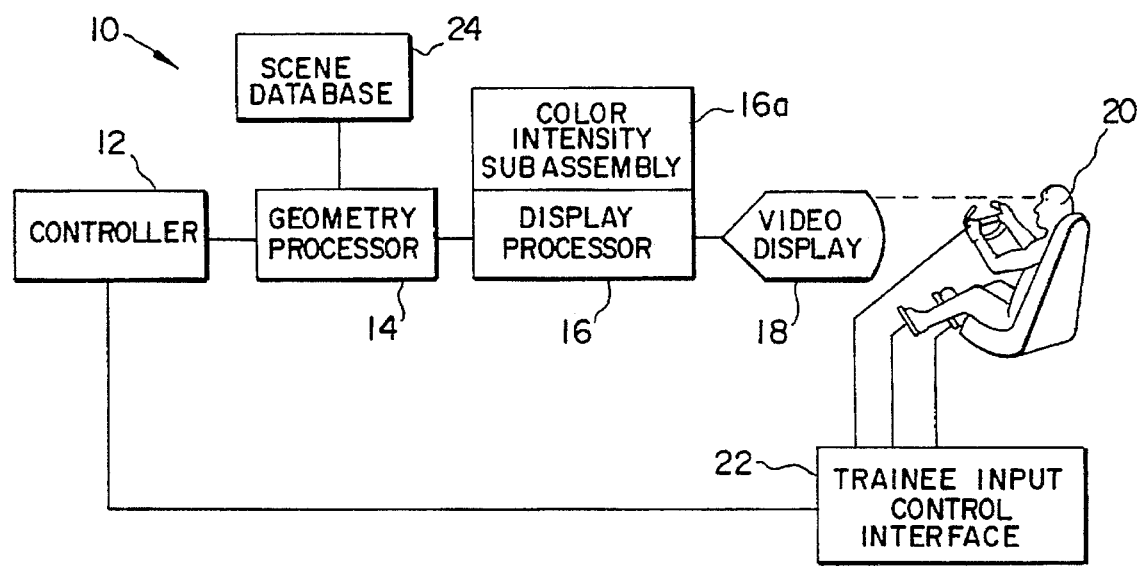
FIG. 1 is a schematic block diagram of a computer image generation (CIG) system in which the apparatus and methods of the present invention may be practiced.

Referring initially to FIG. 1, a functional block diagram of a computer image generation system 10, such as an aircraft cockpit simulation system, is illustrated. The reader is referred to the existing CIG art, including such publications as U.S. Pat. No. 4,727,365, issued Feb. 23, 1988 to Bunker et al., for "Advanced Video Object Generator" and U.S. Pat. No. 4,825,391, issued Apr. 25, 1989 to D. Merz, for "Depth Buffer Priority Processing For Real Time Computer Image Generating Systems", both of which are incorporated herein in their entireties by reference.

The system includes a Controller unit 12, a Geometry Processor unit 14, and a Display Processor unit 16. The Display Processor unit 16 displays information to a cockpit display window 18 to simulate the movement of the aircraft over a scene. A pilot-trainee 20 is linked to the computer image generation system 10 through input control interface 22. The pilot's maneuvering action in the cockpit is fed to input control interface 22. The input control interface converts the appropriate flight data such as air-craft position, aircraft roll, pitch, and yaw attitude, from the pilot to the Controller 12.

In the Controller 12, the pilot inputs are used to calculate a new position and orientation of the aircraft, and from this, a mathematical rotation matrix is calculated that is used to rotate objects from the reference coordinate system to a display coordinate system, which is well known in the art. Other information dealing with the scene, the position of targets, or other aircraft is calculated in the Controller. In some computer image generation systems the Controller unit is a general purpose computer.

The Controller unit 12 is updated periodically by the most recent aircraft orientation. This orientation includes the aircraft roll, pitch, and yaw, and position from the pilot via the input control interface 22, to the Controller 12. The Controller 12 works on a scene for a field or frame time and then passes data to the Geometry Processor 14.

The Geometry Processor 14 reads from a scene database memory 2,4, descriptions of objects such as towers, roads, rivers, hangars, etc., that are potentially visible in the stored three dimensional digital representation of the earth. The objects are read from the scene database and are rotated into display coordinates using the rotation matrix calculated in the Controller 12. The Geometry Processor 14 clips all edges which extend beyond the view window boundaries in object space. It mathematically projects the three-dimensional object data onto the two-dimensional display window. Object faces which extend beyond display window boundaries are clipped in two-dimensional image space. The two dimensional objects consist of points, lines, closed convex polygons, or combinations thereof. Each closed convex polygon is known as a face. Thus, each object processed is made up of individual faces, where each face is bounded by straight edges. Once the faces are computed from the three-dimensional objects, in the Geometry Processor 14, the data is passed to the Display Processor 16. In addition, the Geometry Processor 14 calculates, in known manner, which faces are in front or behind other faces and stores this information in a priority list. The priority list contains the order of all faces in the scene where the first face in the list is the highest priority face, and the last face in the list is the lowest priority face. Whenever two faces overlap on a display, the high priority face will be visible and the overlap portion of the low priority face will be obscured. After calculating the priority list, the Geometry Processor 14 calculates the display endpoints of the line segments that bound the two dimensional faces and calculates the coefficients of the line equations that describe the bounding edges. The Geometry Processor 14 calculates the endpoints of each edge and the slope of each edge that describe a bounded face. These data are then passed on to the Display Processor 16.

In FIG. 1, there is shown Display Processor 16 that is used to drive the video display 18. In some systems, a single Controller 12 and Geometry Processor 14 is used to drive more than one Display Processor. The Display Processor 16 represents the majority of processing and hardware in a real-time computer generation system and, for this reason, most of the effort to reduce the size of the hardware and processing time has been concentrated in the Display Processor area. The Display Processor is responsible for processing information to be displayed on video display 18. The Display Processor 16 has to resolve for each pixel in the video display 18 what the color of the pixel should be, given the many faces that can be present in a pixel, and those portions of faces that may be covered by other faces. After resolving the priority conflicts within a pixel, the area of each visible face within the pixel is multiplied by the color of the face, and the sum of all these weighted colors is output as a pixel color. The Display Processor 16 thus receives two-dimensional face descriptions from the Geometry Processor 14, along with the face color, and a face priority list, and uses this information to output the scene to color video display 18. Each color display in a system can be made up of 1,024 or more lines of video information and on each line there typically are 1,024 individual color dots or pixels (picture elements). Since there may be more than one million pixels in the display, and all of these need to be calculated in 1/60th of a second, the processing load in the Display Processor is very high. For each pixel the display may receive a 12 bit red data signal, a 12 bit green data signal, and a 12 bit blue data signal as part of intensity information that describes the color of the pixel.

Figure 2A:
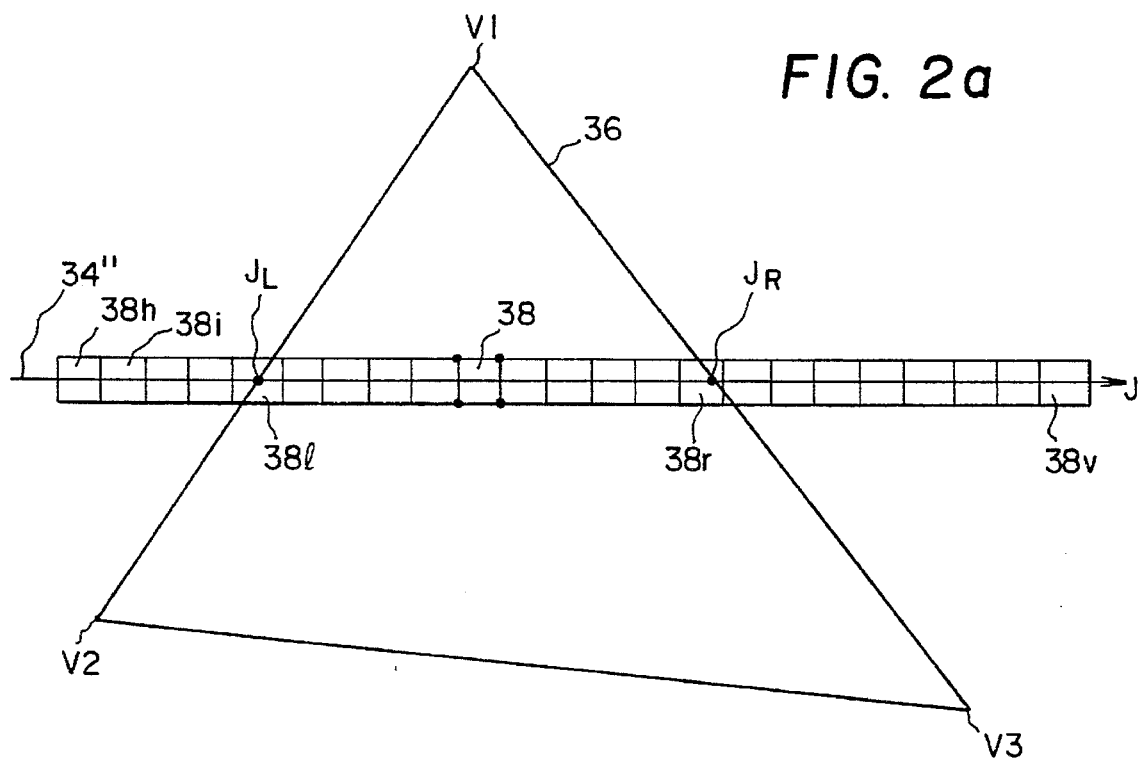
FIG. 2a is a magnified portion of the image display of FIG. 2, in the vicinity of the desired polygon to be displayed.
Figure 2:
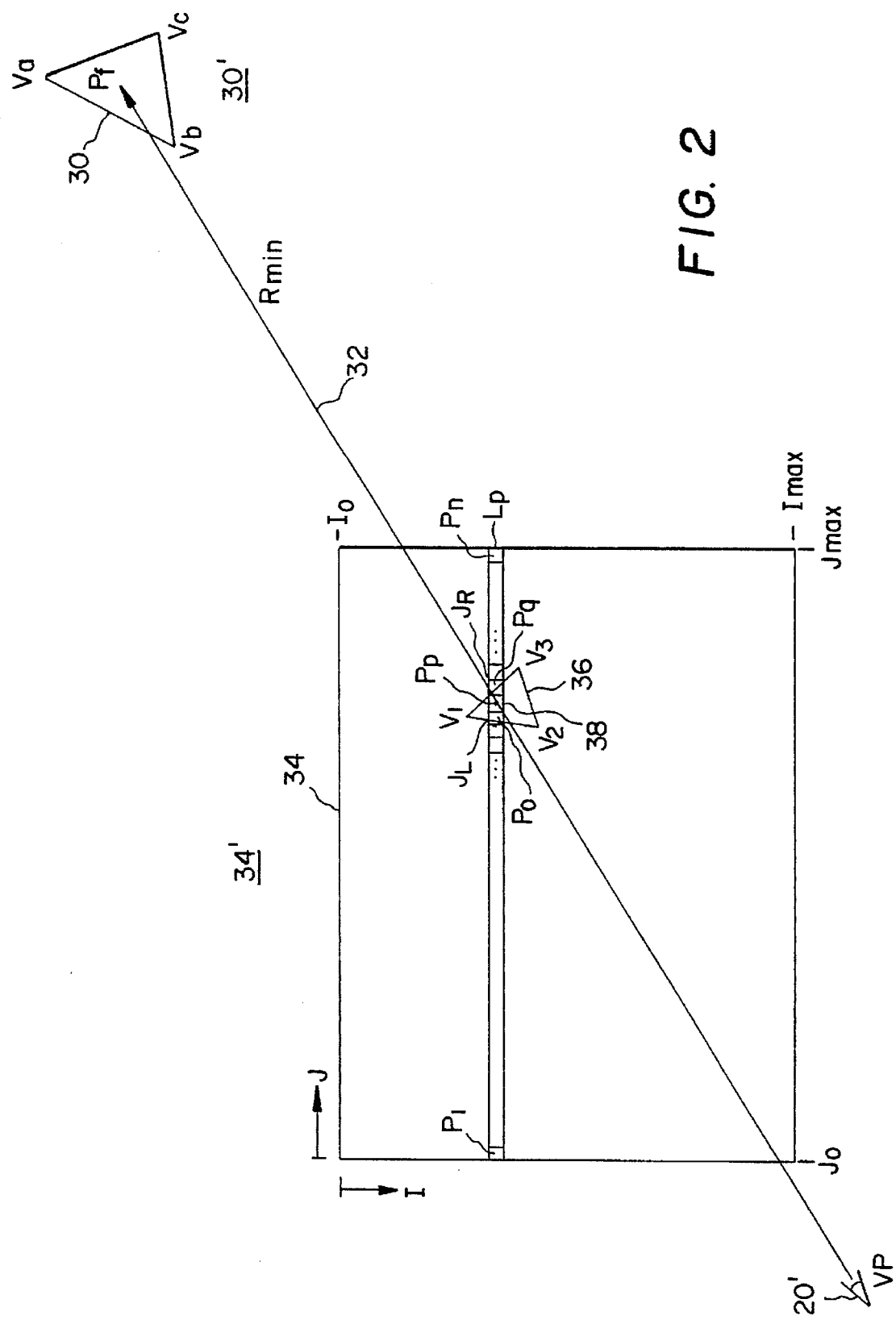
FIG. 2 is a spatial diagram illustrating the relationship between an object face polygon, in object space, and a corresponding image face polygon, in image space, and the picture elements (pixels) of the display raster upon which the image face will appear.

Referring to FIG. 2, the eyes 20' of the observer are at a viewpoint VP and look at a sample face 30 polygon within the view window in object space 30'. Only the face 30 closest to viewer 20', along a view line 32, is seen; the visible face is determined by comparison of range distance R between view point VP and a face point Pf, using depth buffer techniques well known to the art (see, for example, the aforementioned U.S. Pat. No. 4,825,391 and the references cited therein). Thus, visible polygon 30 (here, a triangular face identified by its vertices Va, Vb and Vc) is that polygon having the minimum range $R_{min}$ along view line 32. The object space 30' is projected into a display window 34 in image space 34'; face polygon 30 is projected as display polygon 36, with respective vertices V1, V2 and V3 corresponding to vertices Va, Vb and Vc, respectively. The display window is often the raster of the display, with each pixel 38 scanned in sequential fashion along a horizontal line (in the J direction) from the left edge ($J=J_o$) to the right edge ($J=J_{max}$) of the raster/window, and for lines with increasing distance (in the I direction) down from the raster/window top edge (where $I=I_o$) to the bottom edge ($I=I_{max}$). Thus, the p-th line Lp is scanned from a first (left-hand) pixel Pl to a last (right-hand) pixel Pr. A pixel Pp is identified by the view line 32 passing through the window 34 plane, so that pixel lap includes an image point projecting, and corresponding, to polygon point Pf. The polygon 36 will, along line Lp, include pixels from a leftmost pixel Po, identified by the $J_L$ crossing at the left line location, to a rightmost pixel Pq, identified by the $J_R$ crossing at the right line location.

Expanding the portion of image space being considered, as in FIG. 2a, a row of the pixels 38 along the scan line 34" is sequentially scanned in the J direction, starting at leftmost pixel 38h; the next pixel 38i is then operated upon, and so forth, until a pixel 38l is reached on the left edge of the polygon for that line and partially covered by the polygon 36. This pixel is identified as a leftmost crossing $J_L$ of a polygon edge and the J line 34". Continuing along the line, through other pixels 38 completely covered by the polygon, a pixel 38r is reached on the right edge of the polygon for that line, and partially covered by the polygon 36; this pixel is identified as a rightmost crossing $J_R$ of a polygon edge. Further travel along the J line 34" eventually reaches the rightmost pixel 38v of that scan line. It will be seen that, without consideration of translucency and feedthrough of chroma from a more-distant polygon, the attributes of the pixels 38 completely covered by, and therefore totally within, the polygon 36 have exactly the polygon face attributes (color, intensity, translucency, etc.), while the pixels (e.g. pixels 38l and 38r) partially covered by the polygon 36 have the attributes of that particular polygon only for the pixel portion actually covered, so that the attributes for the remainder of the pixel must be obtained from other information and blended according to the various percentages of the pixel covered by each polygon/source of color information.

Figure 3A:
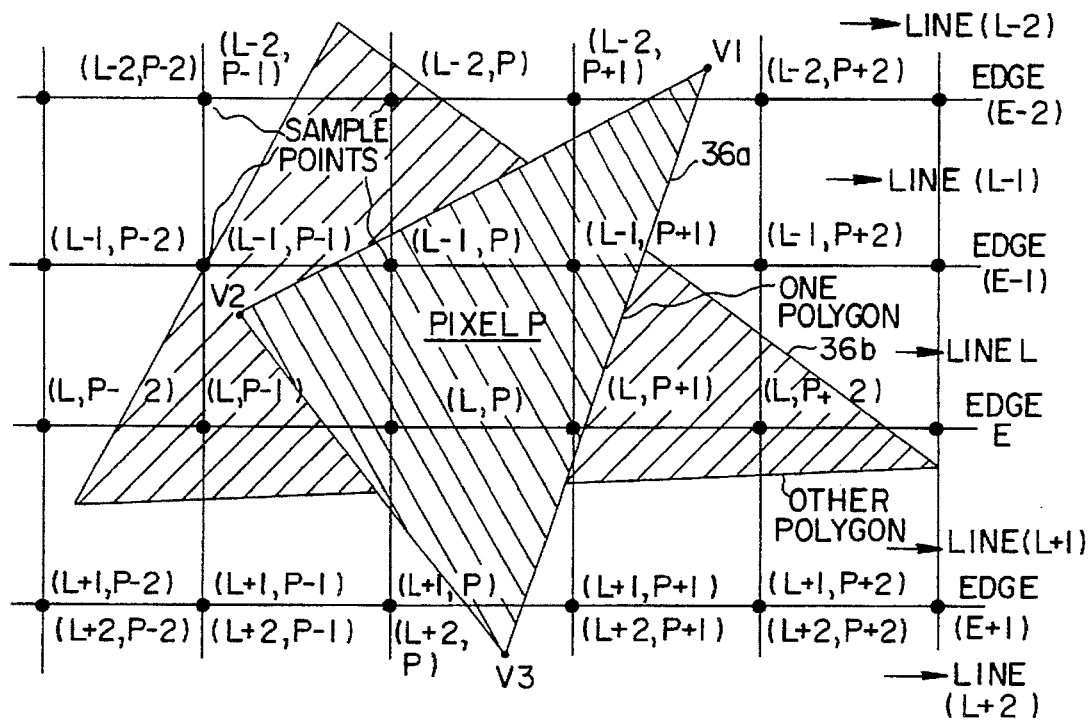
FIG. 3a is a view of an array of display pixels, upon which a pair of face polygons are imaged.
Figure 3B:
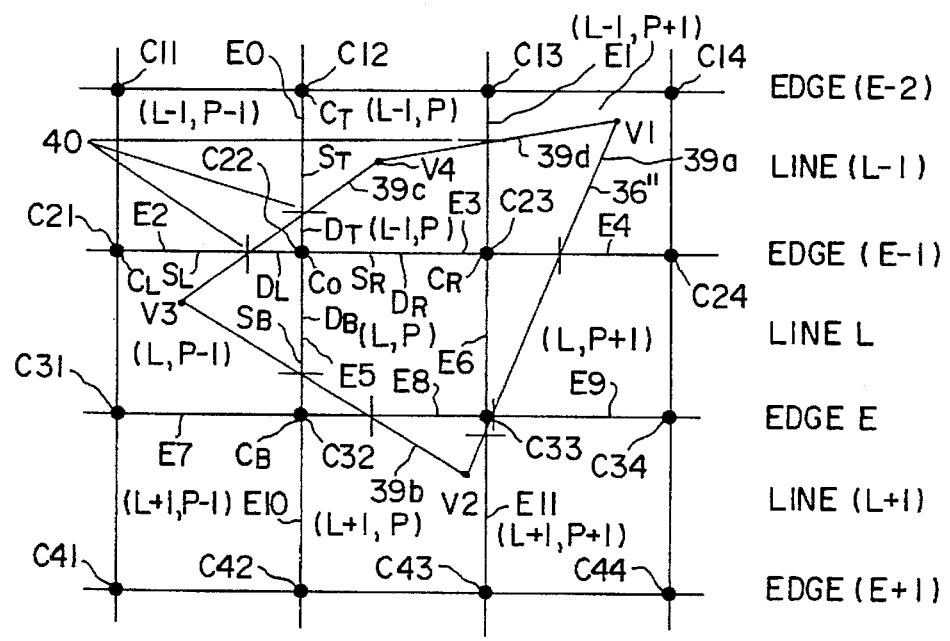
FIG. 3b is a view of an array of display pixels, upon which a face polygon is positioned, and shows the various sampling corners C, pixel edges E and edge distances D necessary for operation of a pixel color data determination method in accordance with the present invention.

This may be understood by reference to FIG. 3a, wherein a first polygon 36a is ordered (as by any of the well-known depth-buffering processes) in front of another polygon 36b, as seen in image space. Polygon 36 has a plurality of vertices (e.g. four vertices V1, V2, V3 and V4 in FIG. 3b) connected by a like plurality of polygon edges 39 (e.g. as shown in FIG. 3b, edges 39a, 39b, 39c and 39d) which cross pixel boundaries at crossings 40. The image screen is formed of a rectangular array of pixels, arranged in vertical columns (e.g. columns ..., P–2, P–1, P, P+1, P+2, ...) sequentially along horizontal lines (e.g. lines ..., L–2, L–1, L, L+1, L+2, ...) with horizontal edges E at the lower demarcation of each line L of pixels with the next-higher-numbered (nextto-be-scanned) pixel line. Each pixel can thus be ordered by its rowline L and column P designation. It will be seen that some pixels, such as pixel (L,P), will be completely covered by only one polygon (polygon 36a) and thus have only the attributes of that polygon; other pixels have a sharing/ blending of the attributes of plural polygons.

In accordance with one aspect of our invention, as shown in FIG. 3b, we prefer to determine color attributes by consideration of the entire pixel and do not need to process color information for a plurality of subportions of each pixel (or subpixels), even if the depth-buffering processing architecture (with or without use of span/subspan processing methodology) of the aforementioned U.S. Pat. No. 4,825,391 is used. It should be understood that each item of information processed in our method is a signal word of electronic digital data; while we may discuss these signals by shorthand designations (e.g. corners, edges, polygons, etc.), we nevertheless mean these terms to signify the data signals used for each of these respective geometrical concepts (e.g. "corner" signifies the data word specifying the two-dimensional pixel corner location, "edge" is the data signal set representing the line of the associated polygon edge, "polygon" means the digital data structure equivalent of a particular polygon, etc.). The end result of our process is to provide a final sequence of video signals (digital video, or analog video derived from digital) which can cause the color and intensity of the individual pixels of the video display means 18 to be illuminated and rendered visible to observer 20.

The polygons 36 are sampled at pixel intervals; here, the sample points are the four corners C of each pixel. For each pixel (L,P), a 4×4 array of corners (e.g. corners C11 through C14 on edge E−2, corners C21 through C24 on edge E−1, corners C31 through C34 on edge E, and corners C41 through C44 on edge E+1) may be used, defining a 3×3 array of pixels (8 adjacent pixels around the central pixel L,P then being considered); the pixel array thus includes pixels (L−1,P−1), (L−1,P) and (L−1,P+1) along line (L−1), pixels (L,P−1), (L,P) and (L,P+1) along line (L) and pixels (L+1, P−1), (L+1,P) and (L+1,P+1) along line (L+1). The color of the polygon 36" which is closest to the viewer that lies on a corner (sample) point Cij (where i is the line designator and j is the column designator for that associated pixel), is stored for each pixel of the display. The resulting color data signals are stored in a video memory which contains the color information of each pixel that makes up the display.

The color information at each corner sample point C in the video memory is computed by conventional means which are familiar to one skilled in the CIG arts. We only need to take color information from one corner of each pixel (e.g. the first encountered, or top-left, corner of each pixel in an LJ display); when data for all top-left corners Co for all adjacent pixels is available, the complete color information for any one particular pixel can be determined. The portion of each pixel represented by the color attribute of a corner can be determined through knowledge of where the polygon edge crossings 40 occur with respect to a predeterminately selected constellation of the line segments about the corner point Co; here, we use a 4-line segment "cross" constellation for the five constellation corners (the central corner Co and the four corner points associated with that central pixel corner Co). From a 12 o'clock position, clockwise about corner Co, these four constellation segments are: a top segment $S_T$, between corner Co and a top corner $C_T$ immediately above corner Co and on the previous edge (E−2); a right segment $S_R$, between corner Co and a right corner $C_T$ which is the immediate next corner along the scan edge (E−1) and to the right of corner Co; a bottom segment $S_B$, between corner Co and a bottom corner $C_B$ immediately below corner Co and on the next edge (E); and a left segment $S_L$, between corner Co and a left corner $C_L$ which is the immediately previous corner along the same edge (E−1). The distance $D_x$, where x is T, R, B or L, from the pixel corner Co to the associated crossing 40 and the respective top, right, bottom or left segment, is determined by processes and means known to the art, and the distance $D_x$ data signals are stored in the video memory. In addition, a translucency flag bit (definable as clear=0 and opaque=1) for each corner sample point Co is added to the video memory.

Referring now to FIG. 3c, if the same polygon covers a pixel sample point Co, the edges of that polygon are considered for determining the location 40x of each of the vertical and horizontal edge crossing between the pixel sample point and the four adjacent sample constellation corners Cx. Thus, constellation edge crossings 40t, 40r, 40b and 40l are determined and the corresponding constellation distances $D_T$, $D_R$, $D_B$ and $D_L$ are all computed and stored in the video memory. However, if the edge crossing distance $D_x$ is greater than the distance between the corner sample points, the distance $D_x$ is clamped to the distance between sample points. The distance between adjacent constellation corners can be set to a normalized value of 1.0; the actual distances $D_x$ are then all normalized and have values between 0.0 and 1.0. As shown, the distance $D_T$ of an edge crossing 40t, from the central corner Co toward central-top corner $C_T$, is less than 1.0 (the full corner-to-corner distance) and is stored as a data signal for the actual distance computed. The same is true of the distances $D_R$ and $D_L$ respectively between the central corner Co and the respective right and left crossings 40r and 40l, since each normalized distance is less than the constellation corner-to-corner distance. This is not the case for the bottom crossing 40b, which is below the adjacent corner $C_B$ and thus has a distance greater than one; the distance value is clamped to 1.0, indicative of the polygon in consideration extending over both corners Co and $C_B$. That is, if the distance $D_x$ is equal to the distance between corner sample points, then the polygon on the central corner point Co is assumed to also cover the corresponding adjacent sample corner. The number of bits used in the data word for each distance $D_x$ is in the range of 3 to 5 bits, but may be varied for different systems. Each corner sample point C is thus the address of a separate location in the video memory, which location contains data specifying a color, a translucency flag, and associated top, left, right and bottom crossing distance data. Also if the polygon on the sample point is translucent, a translucency flag is set.

We presently prefer, since the screen distance ordinarily increases from left to right and from top to bottom, to assume that the sample constellation has a corner interval distance of 1.0 and that the polygon covers both adjacent sample points if the crossing distance is 1.0 for the right and bottom crossing, or if the crossing distance is 0.0 for the left and top crossings. Therefore, a simple truncation and clamping of the distance data words will yield distances which vary from 0.0 to 1.0 from left to right, and from top to bottom; if the top or left crossing is 0.0, the polygon covers the left or top adjacent corner point, and if the bottom or right crossing is 1.0, the polygon covers the bottom or right corner point. This is only one convenient implementation, and can be varied as required for a particular use. Various methods of computing the edge crossing distances are well-known and common practice in computer graphics and will be known to one skilled in the art.

Referring now to FIG. 4, one exemplary color intensity subassembly 16a is shown for processing input vertex data signals to obtain video output data signals for display to the viewer 20, using the procedures shown in the flow diagrams of FIGS. 5a–5e. A first input 16a-1 of the subassembly is coupled to a first input 42a of an edge interception calculator means 42, and receives display polygon vertex data signals in (I,J) coordinates from the rest of the display processor 16; the output 42b of the calculator means is the set of normalized edge crossing data words for the particular pixel then being processed. This pixel (Lp,Pp) is specified by the pixel column number Pp data at the means input 42c, from the subassembly input 16a-2, and the display line Lp number data at the means input 42d, from the subassembly input 16a-3.

The edge data signals appear at a first input 44a of a frame buffer (mass memory) means, having a storage location, of many bits depth; for each of the myriad pixels of the display; each location is uniquely specified by the rowline and pixel column data words at inputs 44c and 44d, respectively (i.e. by rowline $J_o \leq Lp \leq J_{max}$ and column $I_o \leq Pp \leq I_{max}$. The frame buffer also receives polygon color data signals at an input 44e, coupled to subassembly interface 16a-4, and translucency data signals at an input 44f, coupled m subassembly interface 16a-5. The frame buffer input section 44a' stores all of the color/translucency, edge crossing and flags information for each pixel on a per-pixel basis. This data is also provided on a per-pixel basis to frame buffer output 44b; it should be understood that, while the present buffer means is shown as having only a single set of pixel-designating inputs 44c/44d, so that only the one pixel then being addressed will receive input data and supply data at output 44b, it is equally as well understood to provide plural sets of pixel-designating inputs to allow input data to be loaded into one (or more) pixel location while stored data is retrieved and output from one (or more) independently-specified different pixel location.

The frame buffer output 41b provides digital data signals for the corners and edges of the chosen anti-aliasing constellation (here of 12 edges, for 4 adjacent pixels about the central pixel (Lp,Pp) then being processed) to an input 46a of a post processor means 46, the rowline and pixel column data signals are provided to other inputs 46c and 46d. The edge registers are accessed by edge resolver 46-2 to determine the portion of the presently-processing pixel covered by color/translucency attributes of a face polygon; this information is then used by the color mixer 46-3 to set the final blended color of the present (Lp,Pp) pixel and pass that data from post-processor output 46b, as the subassembly output 16a-6 video output data signal (which may be displayed or further processed, as required).

Figure 5A:
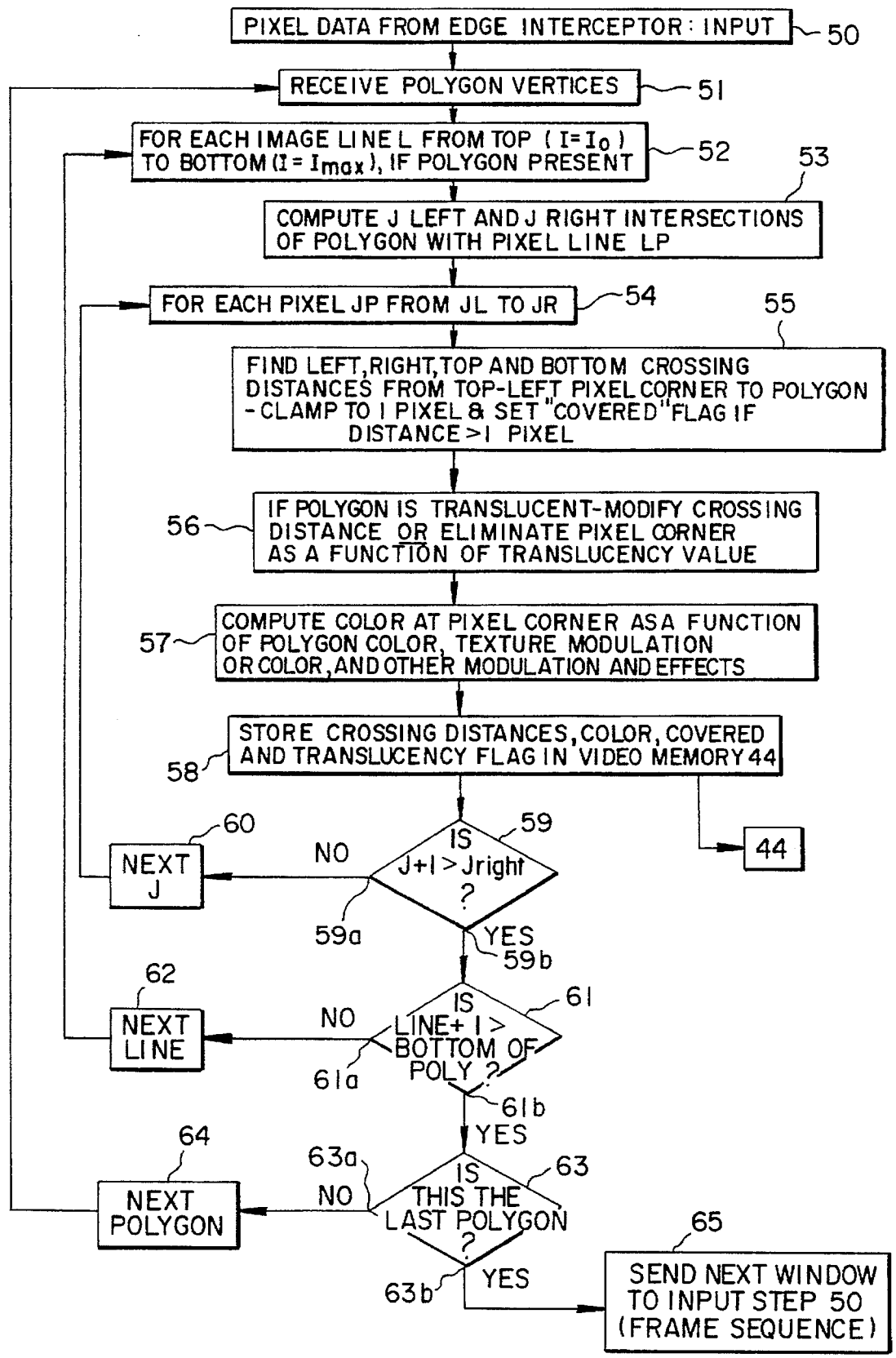
FIGS. 5a, 5b, 5d and 5e are flow charts respectively for the respective edge-determination, segment length determination, small polygon filtering and color mixing process portions utilized in the method of operation of the color intensity subassembly.

The edge intercept calculator performs the process steps shown in the flow chart of FIG. 5a: the pixel rowline Lp and column Pp data signals are received in step 50 and the polygon 36 vertex data signals are received in step 51. In step 52, the beginning of a display line L loop, the calculator determines which display lines L, from the top line (where I=Io) to the bottom line (I=Imax), have the polygon present in at least part of one pixel; these line numbers L are temporarily recorded and the first of the line numbers LP is set. This line number is entered into step 53, where the left and right polygon edge-rowline intersections $J_L$ and $J_R$ are found for that line; these limits are also temporarily stored. Step 54 begins a nested pixel loop, considering each pixel JP along the line LP established in step 52, from the limits (left to right) found in step 53. Inside the nested loop is found steps 55, 56, 57 and 58, respectively acting for: finding, for the top-left corner Co of the pixel, the four crossings $C_x$ and the associated normalized four distances $D_x$ of that corner constellation; clamping the distance $D_x$ to a maximum 1 pixel value, and setting a "covered" flag, if the particular distance $D_x$ is greater than 1 pixel distance (step 55); operating on some aspect of the pixel data if the polygon is translucent (translucency considerations will be discussed in detail hereinbelow); computing the corner point Co color as a function of all related factors, such as polygon color, texture effects (color, modulation, and the like) and so forth (step 57); and then temporarily storing the relevant data signals in video memory (the frame buffer 44). Thereafter, step 59 is entered and the J loop determines: will the J value for a next-sequential pixel will exceed the righthand limit $J_R$? If not, further pixel processing on that Lp line can proceed; output 59a is used and step 60 is entered, to return the loop to step 54, with J=J+1. If the present pixel was at $J_R$, the next pixel contains no part of the present polygon, and output 59b is exited so that the process moves to the next line L=(Lp+1). Step 61 is entered and the line loop determines if the next-sequential line will exceed the lower line limit $L_{max}$ for that polygon? If not, further pixel processing on that line can proceed; output 61a is used and step 62 is entered so that the line loop actually now returns to step 54, with L=L+1; the pixel loop for that new line will be traversed. If the just-completed line was at the bottom of the polygon, the next line contains no part of the present polygon, and output 61b is exited so that the process moves to the next polygon 36'. When the present polygon processing is finished, step 63 is entered and the polygon loop determines if all polygons in the present view window 34 have been considered? If other polygons remain to be processed, exit 63a is taken, the polygon designator is advanced at step 64 and the set of next-polygon vertices fetched (step 51). If no other polygons remain for consideration, further pixel processing in this system portion is not necessary for that display frame; output 61b is exited so that the process moves to the next image window frame of data signals and begins the edge intercept calculation process for the pixel data of that display frame.

TRANSLUCENCY

Each face polygon 36 has a certain, known degree of translucency. We normalize the translucency level so that the level can be denoted by a number between 0.0 (perfectly transparent) and 1.0 (completely opaque). Translucency is accomplished by disregarding or disabling particular pixel corner sample points, so that even though the polygon may lie on (i.e., cover) the sample corner point, the polygon characteristics data is not written into the video memory for that pixel corner; the edge crossings associated with the omitted corner are also not written into memory. By disabling sampling points depending on the amount of translucency, polygons visually behind the translucent polygon can be seen. The more translucent the polygon, the more sample points are disabled. This is analogous to poking holes in the translucent polygon to see what is behind. A pattern select code and translucency value are assigned to a polygon. Translucency value indicates how many sample points to disable, and the pattern select indicates which sample points to disable.

Figure 6A:
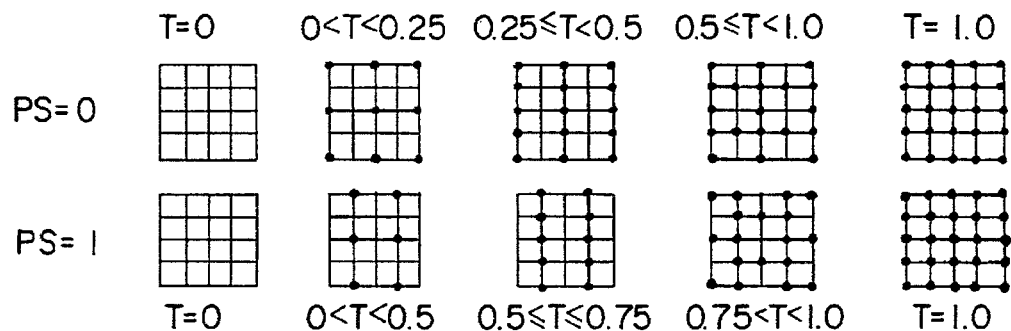

The disablement process may be understood by reference to FIG. 6a, where five different transparency levels T are shown, for each of the two levels of a pattern select (PS) bit. It will be seen that for different ranges of T levels, the translucency disablement pattern for the pattern select bit at a low binary level (PS=0) is complementary to the selected pattern with the pattern select bit at a high binary level (PS=1). While only five levels of translucency T are illustrated, more translucency levels are computable.

Figure 6B:
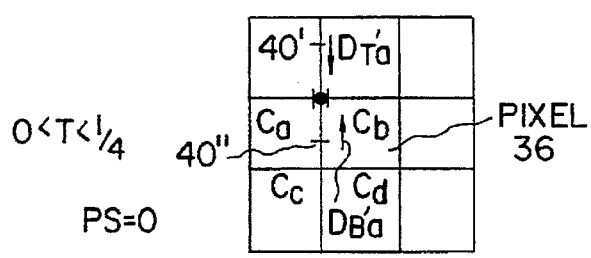
FIGS. 6b–6g illustrate various different translucency operations and conditions, and are all useful in appreciating the manner in which translucent "look-through" is achieved.

The number of T levels is achieved by modifying the edge crossings, as shown in FIGS. 6b–6e, as a function of translucency. The more translucent the face polygon, the less the area assigned to a sample point. This procedure increases or decreases the area of the polygon on each sample corner point: as seen in FIG. 6b, the translucency level T is sufficiently low (0<T<¼) that only one pixel corner $C_a$ is part of the selected pattern, and the other corners $C_b$, $C_c$ and $C_d$ corners of that same pixel are disabled and not considered; the left and right crossings are moved toward the sample point, so that distances $D_{La}$ and $D_{Ra}$ respectively become 1.0 and 0.0, while the modified bottom crossing distance $D'_{Ba}$ becomes $(4*T*D_{Ba})$, where $D_{Ba}$ is the unmodified bottom crossing 40" distance to corner $C_a$. Similarly, the top crossing 40' distance $D_{Ta}$ is modified to $D'_{Ta}=1-(4*T*(D-D_{Ta}))$, where D is the unit pixel edge segment distance. As the translucency level T increases, the edge crossings are moved away from the corner sample point, and increases the effective area of the face polygon in the pixel being considered.

Figure 6C:
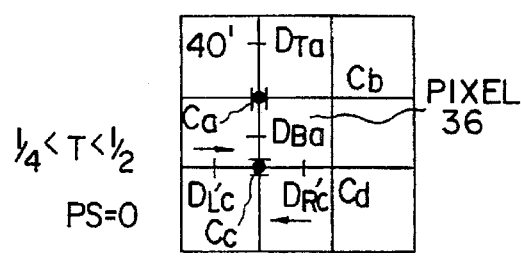

FIG. 6c shows the case where ¼≦T<½: a pair of pixel corners are used (here, corners $C_a$ and $C_c$) and a pair of corners ($C_b$ and $C_d$) are disabled and not considered. For the top corner $C_a$ point, the left and right crossings remain moved toward the sample point, and distances $D_{La}$ and $D_{Ra}$ respectively remain 1.0 and 0.0; the top and bottom crossing distances $D_{Ta}$ and $D_{Ba}$ are not modified. For the bottom corner $C_c$ point, the top and bottom crossing distances $D_{Tc}$ and $D_{Bc}$ respectively become 1.0 and 0.0, while the modified right crossing distance $D'_{Rc}$ becomes $(4*(T-¼)*D_{Rc})$, where $D_{Rc}$ is the unmodified bottom crossing distance for corner $C_c$. Similarly, the left crossing distance $D_{Lc}$ is modified to $D'_L=1-(4*(T-¼)*(D-D_{Lc}))$.

Figure 6D:
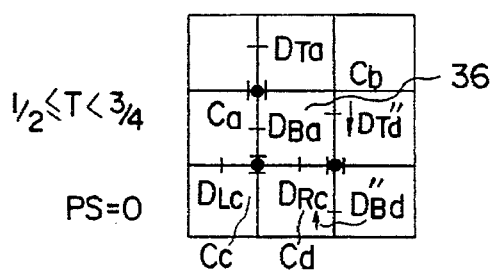
Figure 6E:
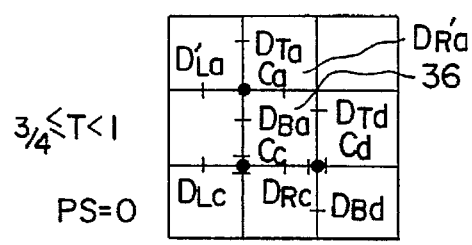

FIG. 6d shows the case where ½≦T<¾: a trio of pixel corners are used (here, corners $C_a$, $C_c$ and $C_d$) and only one corner ($C_b$) is disabled and not considered. The top corner $C_a$ point left and right crossing distances $D_{La}$ and $D_{Ra}$ respectively remain 1.0 and 0.0, and the top and bottom crossing distances $D_{Ta}$ and $D_{Ba}$ are not modified. The bottom corner $C_c$ point top and bottom crossing distances respectively remain 1.0 and 0.0, while the left and right crossings are not changed and remain $D_{Lc}$ and $D_{Rc}$. The $C_d$ corner distances are modified, with the right and left crossing distances being clamped to the respective 1.0 and 0.0 values. The bottom crossing distance $D'_{Bd}$ becomes $(4*(T-½)*D_{Bd})$, where $D_{Bd}$ is the unmodified bottom crossing distance. Similarly, the top crossing distance $D_{Td}$ is modified to $D'_{Td}=1-(4*(T-½)*(D-D_{Td}))$.

Lastly, FIG. 6d shows the case where ¾≦T<0.999: because use of all four corners implies T=1 opaqueness, only a trio of pixel corners are used (again, corners $C_a$, $C_c$ and $C_d$) with one corner ($C_b$) disabled; checking enablement of only corner $C_b$ is contemplated in order to determine full opaqueness (T=1.0). The top corner $C_a$ point left and right crossing distances $D_{La}$ and $D_{Ra}$ respectively are modified to $D'_{La}=1-(4*(T-¾)*(D-D_{La}))$ and $D'_{Ra}=(4*(T-¾)*(D-D_{Ra}))$: the top and bottom crossing distances $D_{Ta}$ and $D_{Ba}$ are not modified. The left bottom corner $C_c$ point top and bottom crossing distances respectively remain 1.0 and 0.0, while the left and right crossings are not modified and remain $D_{Lc}$ and $D_{Rc}$. The bottom-right $C_d$ corner right and left crossing distances remain clamped to the respective 1.0 and 0.0 values, while the top and bottom crossing distance remain at their respective origin values $D_{Td}$ and $D_{Bd}$, respectively.

Figure 6F:
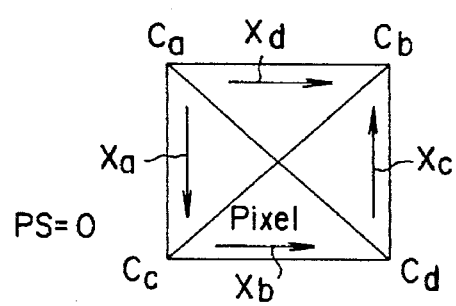
Figure 6G:
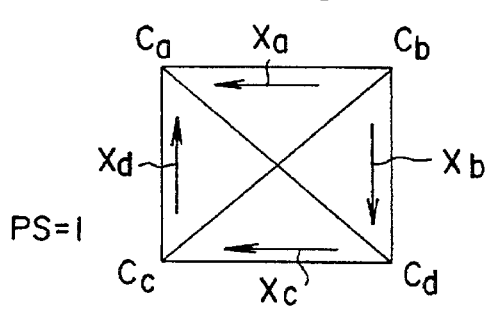

The effect of the above-discussed procedure is to increase or decrease the polygon area affecting the sample corner point, as shown in FIG. 6f (for PS=0) and FIG. 6g (for PS=1). For PS=0, if the translucency T value is between 0 and ¼, then the area of sample corner $C_a$ increases as T increases (greater opaqueness), as shown by arrow $X_a$. If ¼≦T<½, then the area of sample corner $C_c$ increases as T increases, as shown by arrow $X_b$, and, if ½≦T<¾, sample corner $C_d$ area increases as T increases, as shown by arrow $X_c$. The arrow $X_d$ for the increase in the sample corner $C_c$ increases in the clockwise direction, contra to the CCW increases for the other arrows, if T>¾. The opposite changes obtain for PS=1, as shown in FIG. 6g. Each polygon portion covering a pixel may be randomly assigned a pattern-select configuration, which will facilitate derivation of total pixel color information based on the translucency, priority and color of all polygons impinging on the pixel.

POST-MEMORY PROCESSING

Figure 5B:
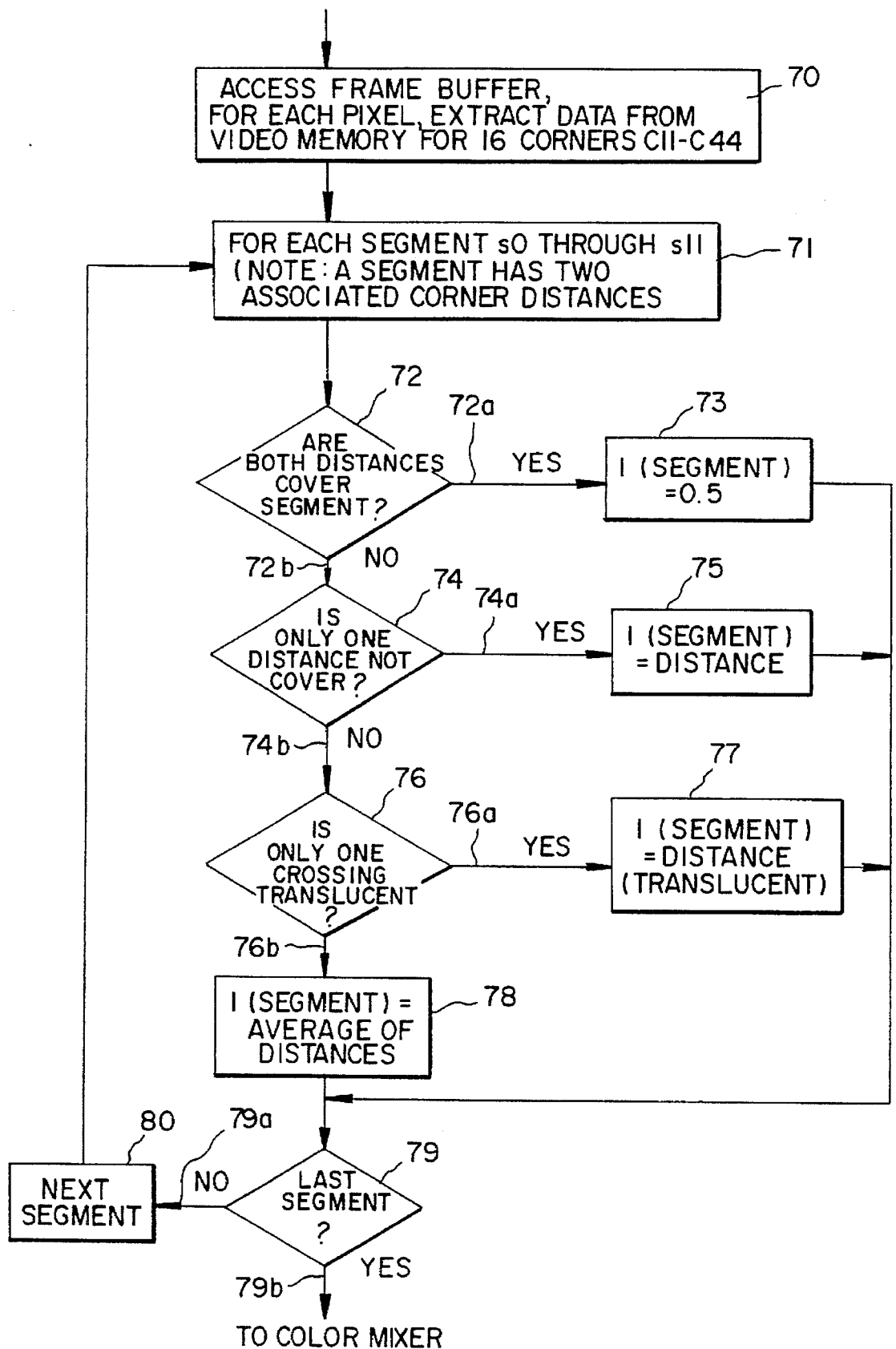

Having resolved corner color and translucency considerations prior to the frame buffer 44, a sequence of data signal modification steps 70–80 are carried out in the post processor-edge resolver process, flow charted in FIG. 5b. These steps can be carried out in time-independent or time-dependent (preferably, interleaved) manner with the edge crossing/corner data signal modification steps 50–65. Whatever pixel information is in the frame buffer will be used; thus, if the interception calculations become stalled or slowed, the previously-stored data signals will be used. The edge-resolution process commences at step 70, with the frame buffer 44 being accessed to obtain the pixel (Lp,Pp) corner $C_o$ constellation data signals, which are associated with the sixteen corners C11–C44 (see FIG. 5b'), positioned along four sequential edges (E+1) through (E−2). A set of twelve corner-to-corner edge segments $S_0$–$S_{11}$ are set up in step 71; each generalized pixel edge segment $S_x$ (see FIG. 5b'') extends between a pair of corners $C_v$ and $C_w$, and each corner has a crossing distance $D_V$ or $D_W$ associated therewith. In order to obtain the length $l$ of each segment, decision step 72 is first entered and an initial determination is made as to whether both $D_V$ and $D_W$ cover segment $S_x$. If so, then the normalized segment length $l$ must be 0.5 (step 73); if not, step 74 determines if both distances $D_V$ and $D_W$ are less than the $S_x$ distance. If so, the segment length is the distance associated with the corner being considered (e.g., $l=D_V$ for corner $C_V$), as set in step 75; if not, step 76 is entered and the translucency of both corners is checked. If only one corner crossing is translucent, step 77 makes the segment length $l$ the associated distance and also sets the translucency flag, but if both crossings are translucent, step 78 sets the segment distance $l$ to an average of the distances $D_V$ and $D_W$. All of steps 73, 75, 77 and 78 exit to step 79, where the segment number $S_x$ (for 0≦S≦11) is checked to determine if further segments need to be processed for that pixel. If so, step 80 increments the segment number S and returns the process to step 71; if not, the segment information data signals are ready for transfer to the Color Mixer.

Figure 7:
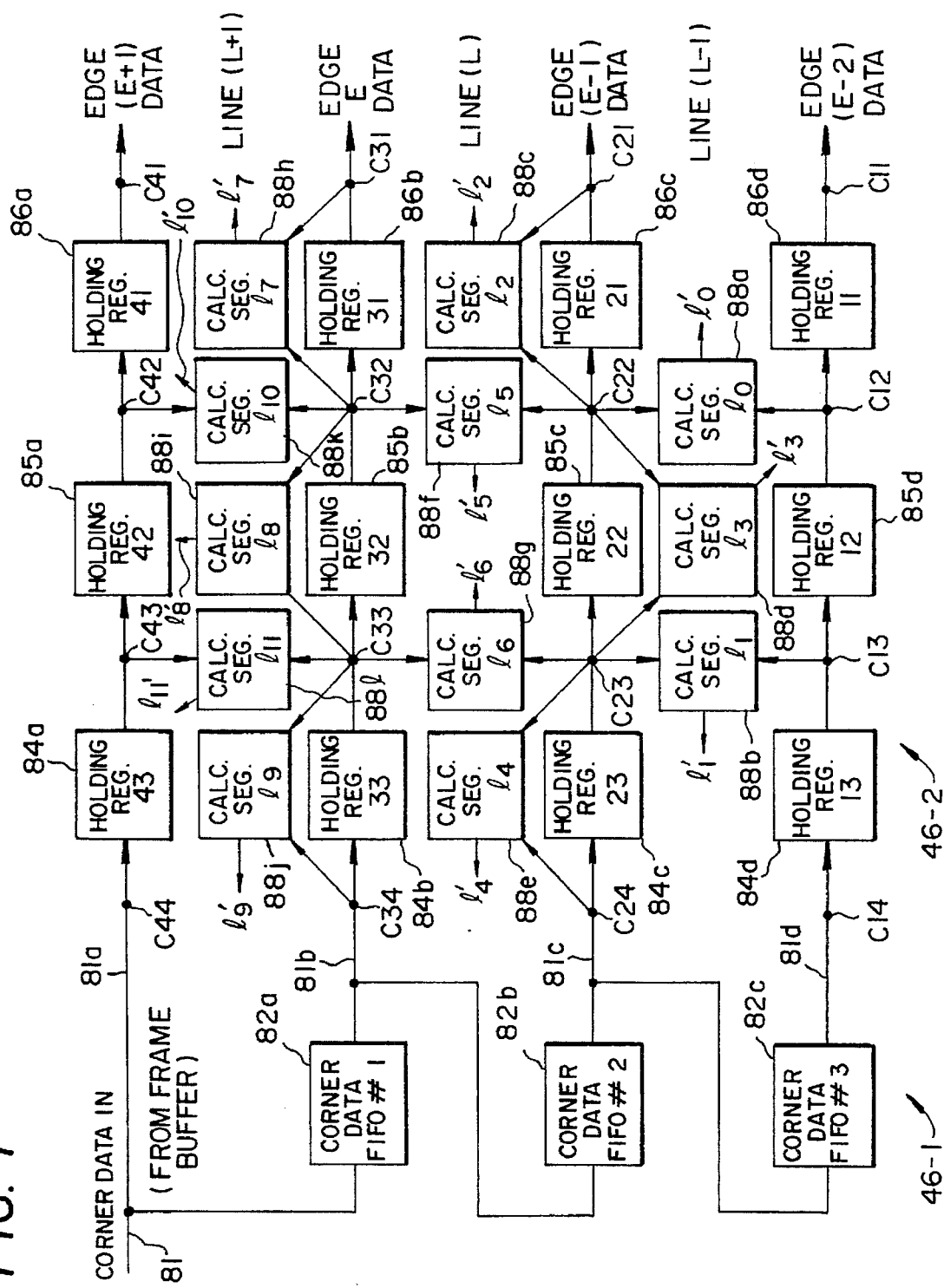
FIG. 7 is a schematic block diagram of one possible implementation of a novel post-processor edge-register/resolver means for a color intensity subassembly in accordance with the invention.

Referring also now to FIG. 7, the edge register and edge resolver portions 46-1 and 46-2 of post processor means 46, may, instead of a specially-programmed computational unit (s), use dedicated logic means receiving corner data input signals on an input bus 81, from the frame buffer. Three first-in-first-out data registers 82a–82c are sequentially connected, so that a temporally different one of four sequential edge data signal trains appears on each of busses 81a–81d. The data for corners on the lower edge E of the present pixel line L will be on bus 81b, while register means 82b has made available on bus 81c the stored immediately-previous line of corner data signals and so provides edge (E−1), and register means 82c has made available on bus 81d the stored data signals from edge (E–2) previous to the (E–1) edge. A subsequent edge (E+1) is then currently available on bus 81a; thus, it will be seen that each pixel P, on line L, is processed only after the data is stored and available for the next-subsequent edge (E+1), which requires availability of the next line (L+1). At any instant, the corner nodes C44, C34, C24 and C14 hold present information, which will (responsive to a next-cycle clock) be entered into a subsequent associated one of holding register means 84, such as: register means 84a has the corner C43 data at its output; register means 84b has the corner C33 data at its output; register means 84c has the corner C23 data at its output; and register means 84d has the corner C13 data at its output. Two subsequent sets of registers 85a–85d and 86a–86d hold other subsequent pixel data, to provide data signals respectively for the different respective corners C42, C32, C22, C12 and C41, C31, C21, C11. Coupled to the proper associated pair of corner data signal nodes is one of a dozen segment calculation means 88a–88l, each providing a calculated segment length $l$ data signal at its associated output 88a'–88l'. Thus, the $S_0$ segment length $l_0$' data signal is provided by calculation means 88a connected between the C12 and C22 nodes; the $S_1$ segment length $l_{S1}$ data signal $l_1$' is provided by calculation means 88b connected between the C13 and C23 nodes; the $S_2$ segment length $l_{S2}$ data signal $l_2$' is provided by calculation means 88c connected between the C21 and C22 nodes; the $S_3$ segment length $l_{S3}$ data signal $l_3$' is provided by calculation means 88d connected between the (222 and C23 nodes; and so forth, up to the $S_{11}$ segment length $l_{S11}$ data signal $l_{11}$' which is provided by calculation means 88l connected between the C33 and C43 nodes. All twelve segment length data signals, for the pixel (Lp,Pp) presently being processed, are then sent to the Color Mixer means 46-3.

In order to display the proper color information for each pixel 36, the signal data for 16 (4×4) adjacent sample corners $C_{11}$–$C_{44}$ (see FIG. 5c) is fetched from the video memory; the sample corner points surround the pixel (Lp, Pp) to be computed. The ultimate goal is to mix a set of four corner blend colors B, e.g. blend color $B_{tl}$ for the top left (tl) corner $C_{tl}$, blend color $B_{tr}$ top right (tr) corner $C_{tr}$, blend color $B_{bl}$ bottom left (bl) corner $C_{bl}$, and blend color $B_{br}$ bottom right (br) corner $C_{br}$, each of which is computed, from the respective corner $C_{ij}$ sampled colors $C_{ij}$', by:

$$tl\_blend\_color\ B_{tl}=(C_{11}'+C_{12}'+C_{21}'+C_{22}')/4$$

$$tr\_blend\_color\ B_{tr}=(C_{13}'+C_{14}'+C_{23}'+C_{24}')/4$$

$$bl\_blend\_color\ B_{bl}=(C_{31}'+C_{32}'+C_{41}'+C_{42}')/4$$

$$br\_blend\_color\ B_{br}=(C_{33}'+C_{34}'+C_{43}'+C_{44}')/4.$$

Figure 5D:
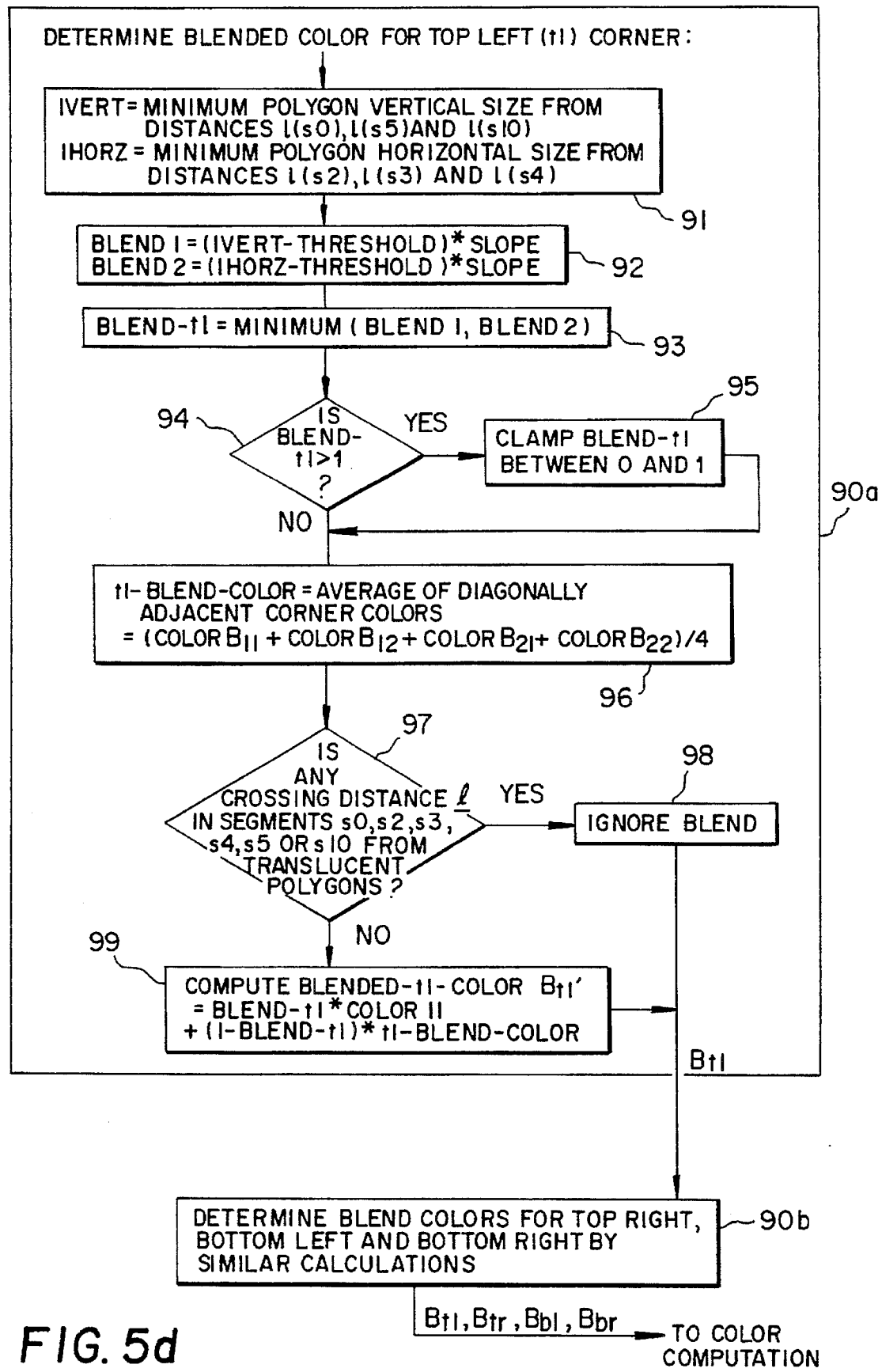
Figure 5E:
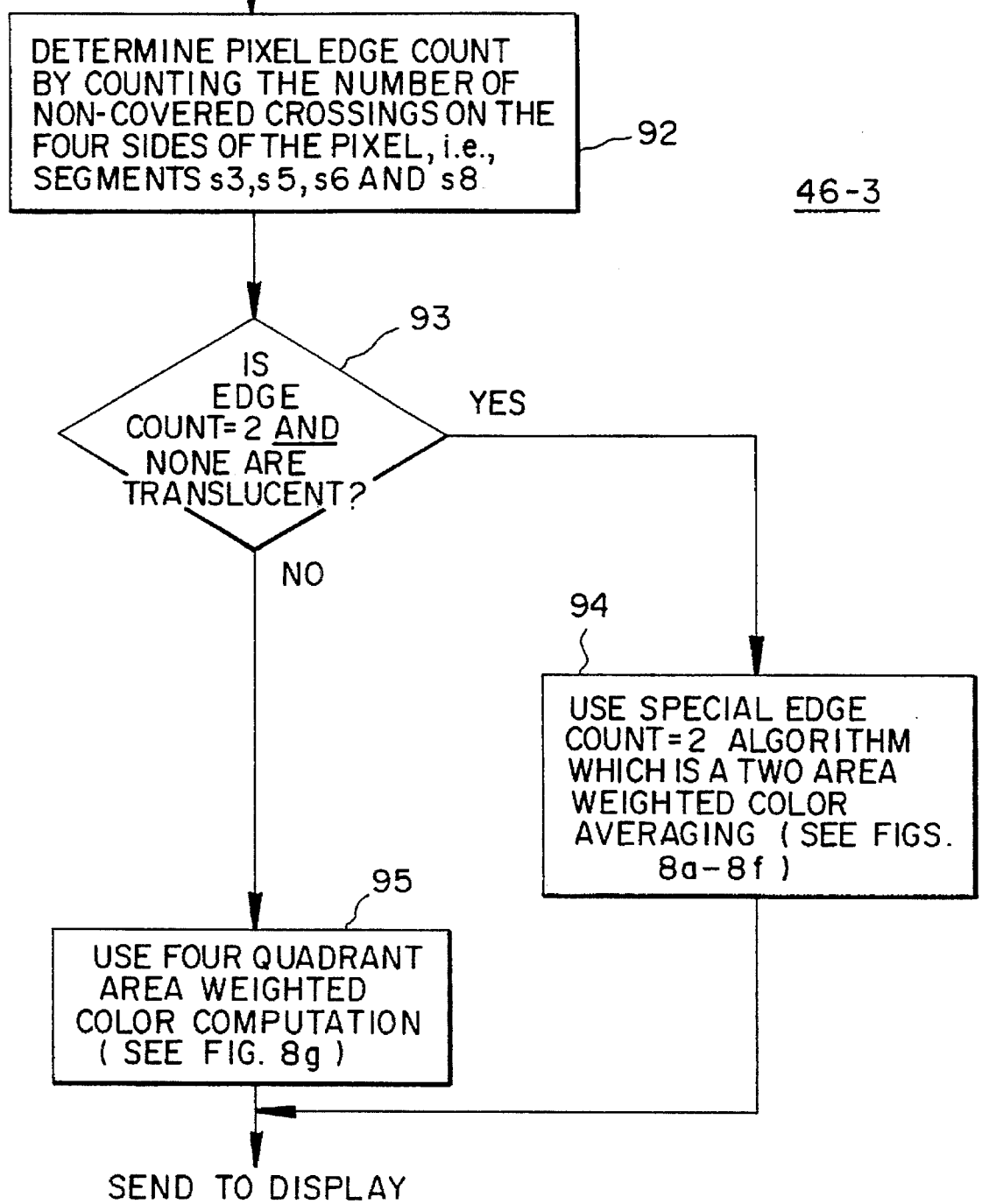

Referring to FIG. 5c, 5d and 5e, the Color Mixer includes Small Polygon Filtering processing (FIG. 5d) followed by Color Computation processing (FIG. 5e).

SMALL POLYGON FILTER

While most face polygons 36 will be sufficiently large so as to cover a plurality of pixels 38, it is possible to have a polygon which will just cover a single pixel. It is also possible to have a polygon, at some level of detail, which is too small to totally cover one pixel. Polygons which are smaller than one pixel, or which have a dimension less than the corner sample point distance D intervals, will scintillate, because, at some positions, the polygon will lie on a sampled corner and be visible, while at other positions the polygon will lie between sample corners and not be visible. Small polygons can be detected and filtered (removed or blurred) to reduce scintillation. To do this, each of the four corners $C_{tl}$, $C_{tr}$, $C_{bl}$ and $C_{br}$ of the present pixel 36 are considered independently. A blend value is computed based on the size of the polygon which covers that corner sample point. The blend color is blended with the color of the sample point. The smaller the polygon the more of the blend color is used instead of the sample point color. The segment crossing lengths $l$ are used to compute the blend value for each corner. This may be done with a procedure which, using corner $C_{tl}$ as an example for step 90a, computes a blend value expressing the various distances. First, find vertical length lvert and horizontal distance lhorz (step 91); then determine first and second blend coefficients Blend_1 and Blend_2 (step 92), and take the minimum thereof (step 93) to get a Blend_tl coefficient. Normalize by comparing the Blend_tl coefficient to a value of 1.0 (step 94) and clamp, if necessary, to a maximum value of 1 (step 95). Step 96 does the four-corner color averaging described above, and then step 97 determines if any crossing distance $l_{Sx}$, for x=0, 2, 3, 4, 5 or 10, i.e. on segments $S_0$, $S_2$, $S_3$, $S_4$, $S_5$ or $S_{10}$ (the segments which, if extend, would pass through corner $C_{tl}$) are obtained from a translucent polygon. If so, the blend color value is ignored (step 98) and set to 0; if no translucent polygons are involved, step 99 finds the blended_tl_color $B_{tl}$', which becomes the final tb_blend_color value $B_{tl}$. This process is repeated in step 90b to find the color for the other three sample points of the pixel, i.e. for the top right corner $C_{tr}$, the bottom left corner $C_{bl}$ and the bottom right corner $C_{br}$ to find the respective final blend color values $B_{tr}$, $B_{bl}$ and $B_{br}$ thereat.

Figure 8A:
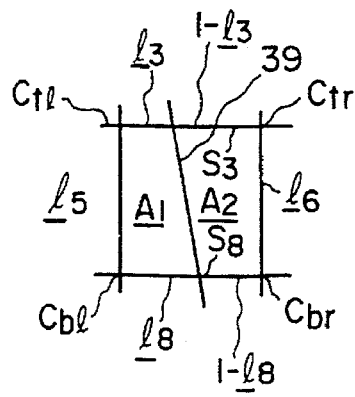
FIGS. 8a–8g show the entire possible set of pixels having a pair of edges cut by a single polygon edge, and the single possible case of a pixel having all four edges cut by edges formed between four polygons overlapping in that one pixel.

Referring now to FIG. 5e, the final Color computation process of the color mixer 46-3 starts with step 92, in which the number of non-covered crossings of the four pixel sides (segments $S_3$, $S_5$, $S_6$ and $S_8$) are counted. The Edge Count number (which must be either zero or at least two) and translucency conditions are used in step 93. If there are 2 edge crossings and none of the four sample corners has a translucent polygon covering it (as determined by a check of the translucency flag) it is assumed that a single polygon edge crosses the present pixel; two areas (an area A1 of a first covering polygon and an area A2, of another covering polygon) need to be computed. This may be seen upon consideration of FIGS. 8a–8f, which show the six possible conditions for a 2-edge crossing situation: in FIG. 8a, edge 39 is near-vertical and so cuts segment $S_3$ into two portions (a left portion with normalized length $l_3$ and, since the total normalized length of any pixel segment is, identically, 1, a right portion with normalized length of $(1-l_3)$); the bottom segment $S_8$ is cut into two portions (a left portion with normalized length $l_8$ and a right portion with normalized length $(1-l_8)$–area A1=0.5$(l_3+l_8)$ and area A2=1–A1 (in all cases), while the pixel color CP is given by $$CP=0.5*(color\ of\ C_{tl}+color\ of\ C_{bl})*A1+0.5*(color\ of\ C_{tr}+color\ of\ C_{br})*A2.$$

Figure 8B:
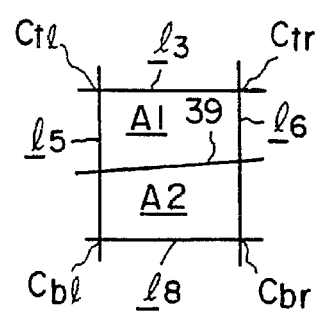

In FIG. 8b, edge 39 is near-horizontal and cuts left segment $S_5$ into two portions (a top portion with normalized length $l_5$ and a bottom portion with normalized length $(1-l_5)$; the right segment $S_6$ is cut into two portions (a top portion with normalized length $l_6$ and a bottom portion with normalized length $(1-l_6)$–area A1=0.5$(l_5+l_6)$, while the pixel color CP is $$CP=0.5*(color\ of\ C_{tl}+color\ of\ C_{tr})*A1+0.5*(color\ of\ C_{bl}+color\ of\ C_{br})*A2.$$

Figure 8C:
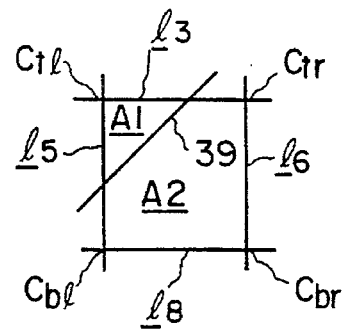

Similarly, in the case of FIG. 8c, the areas are A1=0.5$(l_5*l_3)$, with pixel color $$CP=(color\ of\ C_{tl})*A1+\frac{1}{3}(color\ of\ C_{bl}+color\ of\ C_{br}+color\ of\ C_{tr})*A2.$$

Figure 8D:
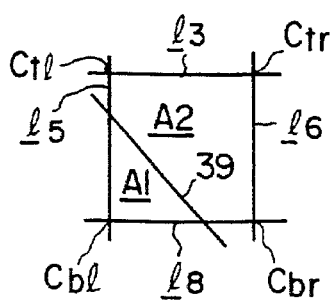

In the case of FIG. 8d, $A1=0.5(1-l_5)*l_8$, with $CP=$(color of $C_{bl}$)$*A1+\frac{1}{3}$(color of $C_{tl}+$color of $C_{br}+$color of $C_{tr}$)$*A2$.

Figure 8E:
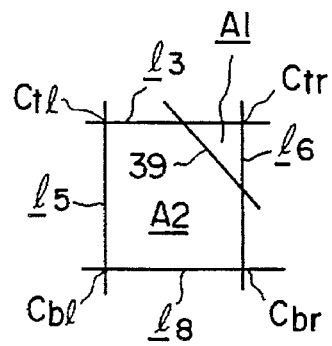

In the case of FIG. 8e, $A1=0.5(1-l_3)*l_6$, with $CP=$(color of $C_{tr}$)$*A1+\frac{1}{3}$(color of $C_{tl}+$color of $C_{br}+$color of $C_{bl}$)$*A2$.

Figure 8F:
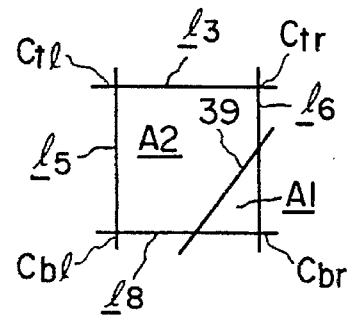

Finally, for the case of FIG. 8f, $A1=0.5((1-l_8)*(1-l_6)$, with $CP=$(color of $C_{br}$)$*A1+\frac{1}{3}$(color of $C_{tl}+$color of $C_{bl}+$color of $C_{bl}$)$*A2$.

Figure 8G:
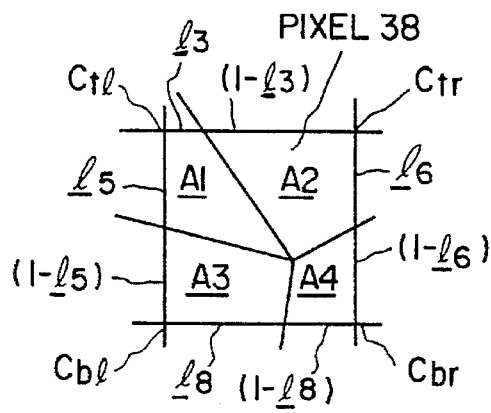

If there are not two edge crossings, or if the translucency flag bit is set at any of the four corner sampling points, then the pixel is treated as having four separate areas A1, A2, A3 and A4 and 4 crossings; an area-weighted computation step 95 must be used. This is shown graphically in FIG. 8g; the areas compute as:

$A1 = 1/4(l_3 + l_5)$   $A2 = 1/4((1 - l_3) + l_6)$
$A3 = 1/4((1 - l_5) + l_8)$   $A4 = 1/4((1 - l_6) + (1 - l_8))$

The final mixed pixel Color CP data is thus:

$CP=$(color of $C_{tl}$)$*A1+$(color of $C_{tr}$)$*A2+$(color of $C_{bl}$)$*A3+$(color of $C_{br}$)$*A4$.

The mixed color CP information for the pixel having been finally determined in either step 94 or 95, this pixel color data signal is output to the display, for presentation to viewer 20.

While one presently preferred embodiment of the apparatus and methods for determining pixel color content in a computer image generator has been described in detail herein, many variations and modifications will now become apparent to those skilled in the art. It is therefore our intent to be limited only by the scope of the appending claims and not by way of the specific instrumentalities and steps presented by way of explanation herein.

What is claimed is:

1. A method for determining the final viewable color of each of an array of pixels to be displayed responsive to a video data signal output of a computer image generator, comprising the steps of:

(a) first receiving input data signals characterizing a set of display space (I,J) coordinates of each of at least three vertices of each of at least one face polygon to be displayed, each different pair of the vertices defining a different edge of the associated face polygon;

(b) generating, responsive to the received vertex data signals, a data signal describing a location of a crossing, if any, of each face polygon edge along an associated one of a plurality of edge segments bounding each pixel of the display pixel array;

(c) storing, on a per-pixel basis, the edge segment crossing data signals for all face polygons affecting that pixel, along with color data for each of the face polygons occupying any portion of that pixel;

(d) processing, for each pixel to be displayed, stored data for a plurality of different edge segments of a selected constellation of a plurality of adjacent pixels, to obtain a color intensity data signal for each corner of each displayable pixel; and (e) mixing color intensity data signals for all corners of a presently-processed pixel, to determine the final, observable color of that display pixel.

2. The method of claim 1, wherein step (b) includes the steps of: utilizing selected ones of a set of the four pixel corners as sample points; and determining crossing location data for edge segments extending from a designated one of the pixel corners to another corner of the same pixel.

3. The method of claim 2, wherein step (c) further includes the steps of: determining a translucency value T for each pixel between transparent and opaque; not storing any data for a pixel having a T value indicating transparency; and increasing a number of corner sample points for which data is stored responsive to increasing the translucency value T.

4. The method of claim 3, including the step of storing data for all four pixel corners only if that pixel has a translucency value T for full opaqueness.

5. The method of claim 3, further including the steps of: providing a plurality of complementary patterns of pixel corners at which data is to be stored, for each of a plurality of ranges of T values less than a maximum value; and selecting a different one of the patterns for any face polygon.

6. The method of claim 5, further including the step of randomly selecting one of a pair of patterns for each polygon having a T value within a preselected range and associated with a particular display pixel.

7. The method of claim 1, wherein step (d) includes the step of selecting constellation pixels to be adjacent to at least one edge segment joining pairs of the pixel corners.

8. The method of claim 7, including the step of configuring the constellation to include four other pixels, adjacent to the pixel being processed.

9. The method of claim 8, further including the step of selecting the other constellation pixels to be respectively immediately above, below, preceding and following the pixel being processed.

10. The method of claim 1, wherein a plurality of face polygons contribute to the color of the pixel being process, and further including the step of obtaining the color of the pixel being processed by blending chroma data from all polygons covering any active one of the corners of that pixel.

11. The method of claim 10, further including the step of modifying the chroma data from each covering polygon responsive to the translucency of the particular polygon, prior to chroma blending.

12. The method of claim 11, further including the step of digitally filtering out all polygons having an area less than the area of one display pixel.

13. The method of claim 1, wherein step (b) further includes the steps of: determining a translucency value T for each pixel between transparent and opaque; and varying a number of corner sample points for which data is stored responsive to variation of the translucency value T.

14. The method of claim 13, further including the step of increasing the magnitude of the edge crossing data to move the associated edge crossing away from an associated pixel corner, responsive to an increase in the translucency value of the polygon associated with that pixel corner.

15. The method of claim 14, further including the step of clamping the value of the edge crossing data to a predetermined maximum if the edge crossing distance in a selected direction is greater than an inter-sample point distance.

16. The method of claim 15, wherein the display space is a display raster, and including the steps of: modifying edge crossing distances in a first raster direction for selected ones of the pixel corners; and modifying edge crossing distances in a second direction, generally perpendicular to the first raster direction, for all remaining ones of the pixel corners.

17. A color intensity subassembly for a display processor in a computer image generator (GIG), comprising:

edge interception calculator means, receiving input data signals characterizing a set of display space (I,J) coordinates for each of at least three vertices of each of a multiplicity of face polygons to be displayed, for determining (a) which edge segments, if any, of each of a sequential series of viewable display pixels are crossed by a polygon edge defined by each different pair of the received vertex data signals, and (b) a location of the crossing along the associated pixel edge segment;

frame buffer means for storing, on a per-pixel basis, the edge crossing data signals for all polygons affecting each pixel, along with color data for each of the face polygons occupying any portion of that pixel; and post processor means, receiving from the frame buffer means data signals characterizing, for each pixel to be displayed, a plurality of edge data signals for a constellation of a plurality of adjacent pixels, for resolving edge relationships and mixing polygon color intensity data to determine the final, observable color data signal for each pixel to be displayed by a display means receiving a video data output of the CIG.

18. The subassembly of claim 17, wherein said post processor means further receives data signals describing a translucency value T of each polygon contributing to the total color of a present pixel, and blends the color information signals thereof responsive to the T values received.

19. The subassembly of claim 17, wherein the pixel constellation includes four additional pixels adjacent to each pixel presently being processed.

20. The subassembly of claim 19, wherein the post processor means includes: corner data register means for simultaneously providing data signals for corners along a plurality of display raster edge lines; holding register means, receiving the data signals for each edge line, for simultaneously providing data signals for a plurality of corners along each of the plurality of edge lines; and segment calculator means, connected to the register means, for determining a crossing length along each of a plurality of constellation pixel edges.

* * * * *